United States Patent
Roh et al.

(10) Patent No.: US 7,394,793 B2
(45) Date of Patent: Jul. 1, 2008

(54) METHOD AND APPARATUS FOR GENERATING PREAMBLES IN A BROADBAND WIRELESS COMMUNICATION SYSTEM USING MULTIPLE ANTENNAS

(75) Inventors: Won-Il Roh, Yongin-si (KR); Jae-Ho Jeon, Seongnam-si (KR); Soon-Young Yoon, Seoul (KR); Seung-Joo Maeng, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 655 days.

(21) Appl. No.: 11/077,853

(22) Filed: Mar. 11, 2005

(65) Prior Publication Data
US 2005/0201334 A1    Sep. 15, 2005

(30) Foreign Application Priority Data
Mar. 12, 2004    (KR)    ............... 10-2004-0017099

(51) Int. Cl.
*H04B 7/216* (2006.01)
(52) U.S. Cl. .............. 370/335; 370/209; 370/334; 370/342; 370/343; 375/260; 375/295; 375/299; 455/101; 455/102; 455/103; 455/562.1
(58) Field of Classification Search .............. 370/209, 370/335, 342, 343, 334; 375/260; 455/101–103, 455/562.1
See application file for complete search history.

(56) References Cited

U.S. PATENT DOCUMENTS

| 2003/0153322 | A1* | 8/2003 | Burke et al. ............... 455/450 |
| 2003/0215021 | A1* | 11/2003 | Simmonds ................. 375/260 |
| 2004/0085939 | A1* | 5/2004 | Wallace et al. ............. 370/335 |
| 2006/0023666 | A1* | 2/2006 | Jalali et al. ................ 370/334 |
| 2007/0066362 | A1* | 3/2007 | Ma et al. ................. 455/562.1 |
| 2007/0201572 | A1* | 8/2007 | Krauss et al. .............. 375/260 |
| 2007/0274408 | A1* | 11/2007 | Ma et al. .................. 375/260 |

* cited by examiner

*Primary Examiner*—George Eng
*Assistant Examiner*—Mehmood B Khan
(74) *Attorney, Agent, or Firm*—The Farrell Law Firm, PC (57) ABSTRACT

A preamble generation method and apparatus are provided for improving transmit diversity by changing a preamble structure in a broadband wireless communication system using multiple antennas based on a multiple input multiple output (MIMO) scheme. First pilot tones associated with different antennas are selected. The first pilot tones are multiplied by different first Walsh codes. Second pilot tones associated with the same antenna are sequentially selected along a frequency axis. The second pilot tones are multiplied by a second Walsh code. Preambles are generated by assigning, to at least two symbol durations, output signals multiplied by the first and second Walsh codes. Consecutive pilot tones during each of the at least two symbol durations are spaced by one pilot tone, and code streams of the first and second Walsh codes are alternately multiplied by the pilot tones. The preamble structure has orthogonality between the antennas using frequency, time and code domains.

9 Claims, 6 Drawing Sheets

METHOD AND APPARATUS FOR GENERATING PREAMBLES IN A BROADBAND WIRELESS COMMUNICATION SYSTEM USING MULTIPLE ANTENNAS

PRIORITY

This application claims priority to an application entitled "METHOD AND APPARATUS FOR GENERATING PREAMBLES IN A BROADBAND WIRELESS COMMUNICATION SYSTEM USING MULTIPLE ANTENNAS", filed in the Korean Intellectual Property Office on Mar. 12, 2004 and assigned Serial No. 2004-17099, the contents of which are incorporated herein by reference.

BACKGROUND OF THE INVENTION

1. Field of the Invention

The present invention relates generally to a method and apparatus for improving transmit diversity in a broadband wireless communication system, and more particularly, to changing a preamble structure in a broadband wireless communication system using multiple antennas based on multiple input multiple output (MIMO) to improve transmit diversity.

2. Description of the Related Art

Wireless communication systems with multicarrier transmission techniques were first applied to military radio communications in the late 1950's. An orthogonal frequency division multiplexing (OFDM) technique, serving as a representative multicarrier transmission technique for overlapping orthogonal subcarriers, started in the 1970's. The OFDM technique converts a serially input symbol stream into parallel signals and modulates the parallel signals using a plurality of orthogonal subcarriers to transmit the modulated parallel signals. In view of orthogonal modulation between multiple carriers, the OFDM technique is limited.

In 1971, Weinstein, et al. proposed that OFDM modulation/demodulation can be performed efficiently using discrete Fourier transform (DFT). The introduction of a guard interval further reduced adverse effects of multipath propagation and delay spread in an OFDM system. Although hardware complexity was an obstacle to OFDM system implementation, recent advances in digital signal processing technology, including fast Fourier transform (FFT) and inverse fast Fourier transform (IFFT), make it possible to implement the OFDM system.

As a result, OFDM has been widely used for digital data communication technologies, such as digital audio broadcasting (DAB), digital TV broadcasting, wireless local area network (WLAN), and wireless asynchronous transfer mode (WATM). OFDM has efficient frequency use and reduces the effects of intersystem interference (ISI) by using guard intervals. Because OFDM is robust against multipath fading, it can provide optimum transmission efficiency when high-speed data is transmitted.

Multiple access techniques based on OFDM are usually classified as a orthogonal frequency division multiple access (OFDMA) technique or a frequency hopping (FH)-OFDM technique. An example of OFDMA in a broadband wireless communication system is the well-known Institute of Electrical and Electronics Engineers (IEEE) 802.16d or 802.16e system. The IEEE 802.16 standardization group is currently creating the IEEE 802.16d/e standard for providing wireless broadband Internet service to a fixed or mobile terminal through broadband wireless communication systems such as OFDMA, etc.

The OFDMA system can assign a plurality of subchannels configured by different subcarriers to different users. When an adaptive antenna system (AAS) is used to improve system capacity in the OFDMA system, a multiuser diversity gain can be obtained. When a multiple input multiple output (MIMO) system is used as a representative example of the AAS, information is spatially multiplexed and then transmitted, such that communication system performance is improved significantly.

A system for transmit diversity through multiple antennas in a cellular base station based on the OFDMA or OFDM technique has a relatively simple transceiver structure and a high diversity gain. The transmit diversity is included as an option in an IEEE 802.16d system. Accordingly, a preamble structure is included so that a receiver can discriminate signals received from a number of transmit antennas. However, only preambles for two transmit antennas are provided in the prior art.

The introduction of a base station with four or more antennas is required to obtain a high diversity gain. Conventional methods, therefore, are limited for maintaining orthogonality between antennas on the basis of frequency division.

SUMMARY OF THE INVENTION

It is, therefore, an aspect of the present invention to provide a preamble generation method and apparatus for obtaining transmit antenna diversity in a broadband wireless communication system with multiple antennas.

The above and other aspects of the present invention can be achieved by a method for generating preambles in a wireless communication system using multiple antennas based on a multiple input multiple output (MIMO) scheme. The method includes selecting first pilot tones associated with different antennas, and multiplying the first pilot tones by different first Walsh codes; sequentially selecting second pilot tones associated with the same antenna along a frequency axis, and multiplying the second pilot tones by a second Walsh code; and generating preambles by assigning, to at least two symbol durations, output signals multiplied by the first and second Walsh codes, wherein consecutive pilot tones during each of the at least two symbol durations are spaced by an interval corresponding to one pilot tone, and code streams of the first and second Walsh codes are alternately multiplied by the pilot tones.

The above and other aspects of the present invention can be achieved by an apparatus for generating preambles in a wireless communication system using multiple antennas based on a multiple input multiple output (MIMO) scheme. The apparatus includes a pilot tone selection unit for selecting first pilot tones associated with different antennas and sequentially selecting second pilot tones associated with the same antenna along a frequency axis; a Walsh multiplication unit for multiplying the first pilot tones by different first Walsh codes, and multiplying the second pilot tones by a second Walsh code; a preamble generation unit for generating preambles by assigning, to at least two symbol durations, output signals multiplied by the first and second Walsh codes; and a symbol insertion unit for inserting symbols including the preambles assigned to the at least two symbol durations, wherein the Walsh multiplication unit multiplies alternating code streams of the first and second Walsh codes by the pilot tones in a state in which consecutive pilot tones during each of the at least two symbol durations are spaced by an interval corresponding to one pilot tone.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings.

In the following description, a detailed description of known functions and configurations incorporated herein will be omitted for conciseness.

Figure 1A:
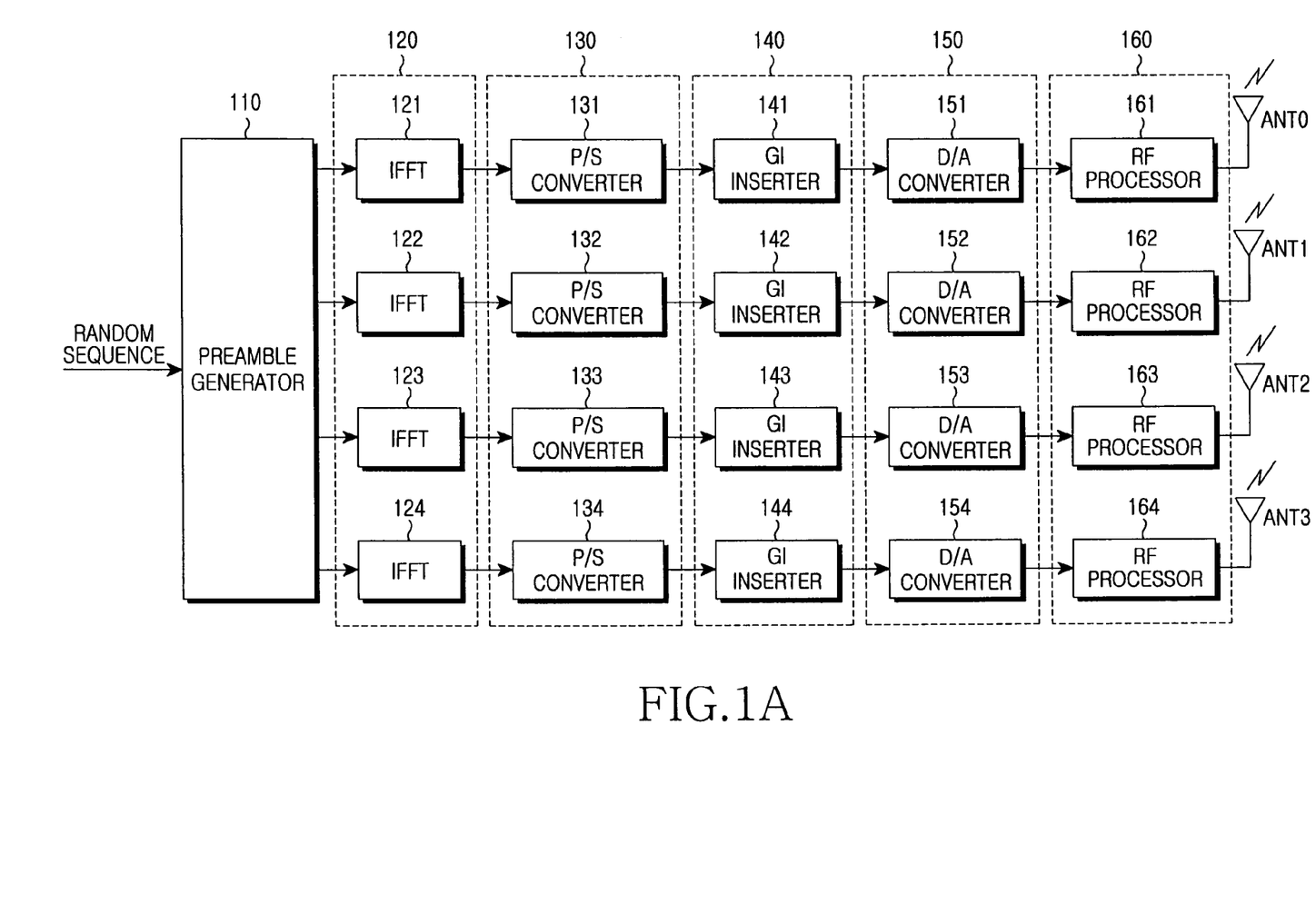
FIG. 1A is a block diagram illustrating a transmitter to which a preamble generation method in accordance with an embodiment of the present invention is applied in a broadband wireless communication system.

FIG. 1A is a block diagram illustrating a transmitter of a base station in an orthogonal frequency division multiplexing (OFDM) communication system in accordance with an embodiment of the present invention is applied. The transmitter of FIG. 1A includes a preamble generator 110 for generating one or more preambles to be located at the beginning of a frame and to be used when a mobile terminal performs system synchronization and channel estimation; a plurality of inverse fast Fourier transform (IFFT) processors 120 or 121 to 124 for transforming modulation signals input in a parallel fashion using IFFT; a plurality of parallel-to-serial (P/S) converters 130 or 131 to 134 for converting parallel modulation signals into serial signals; a plurality of guard interval (GI) inserters 140 or 141 to 144 for inserting GIs into symbol streams serving as the serial signals; a plurality of digital-to-analog (D/A) converters 150 or 151 to 154 for converting digital signals into analog signals; a plurality of radio frequency (RF) processors 160 or 161 to 164; and, a plurality of antennas ANT0 to ANT3.

The transmitter of FIG. 1A may include an encoder, a symbol mapper, a subchannel assigner, and a serial-to-parallel (S/P) converter (not illustrated) sequentially connected before the IFFT processors 120. Because these components are well known, their detailed description will be omitted.

More specifically, the transmitter of FIG. 1A includes a predetermined preamble generator 110 for generating multiple preambles to improve transmit diversity through a plurality of antennas ANT0 to ANT3. In this embodiment, a structure of two preambles applied to four antennas will be described to provide an example.

In FIG. 1A, the preamble generator 110 receives a random sequence to be used to discriminate a base station, multiplies the received random sequence by four different Walsh codes according to the antennas ANT0 to ANT3, and outputs the multiplication. The random sequence preferably uses the well-known pseudo random noise (PN) code.

Combinations of the four Walsh codes will be described below.

This embodiment assigns preambles by multiplying the random sequence used to discriminate a base station, by each antenna Walsh code. Alternatively, when the base station does not need to be discriminated as in a broadcasting service), a corresponding antenna can be discriminated by Walsh codes rather than a random sequence.

The plurality of IFFT processors 120 receive output signals from the preamble generator 110, perform N-point IFFT on the received signals, and then output IFFT signals to the P/S converters 130. The P/S converters convert the received signals into serial signals, and output the serial signals to the GI inserters 140. The GI inserters insert predetermined GIs into the received signals, and output, to the D/A converters 150, the signals into which the GIs have been inserted. When an OFDM symbol is transmitted in an orthogonal frequency division multiple access (OFDMA) communication system, a GI is inserted to remove interference between a previous OFDM symbol transmitted at a previous OFDM symbol time, and a current OFDM symbol to be transmitted at a current OFDM symbol time.

The D/A converters 150 receive the signals into which the GIs have been inserted convert them into analog signals, and output the analog signals to the RF processors 160 which include a filter and a front-end unit (not illustrated). The RF processors 160 convert the analog signals output from the D/A converters 150 into RF signals for transmission via an air interface. The RF signals are transmitted through the Tx antennas ANT0 to ANT3. The preamble generator 110 maintains orthogonality between the antennas by using different Walsh code streams, configured by 4 combinations according to the antennas ANT0 to ANT3, and forms a structure of two preambles to transmit two symbols.

The preamble structure in accordance with an embodiment of the present invention has orthogonality between the antennas using three domains associated with a frequency, time, and Walsh code.

Figure 1B:
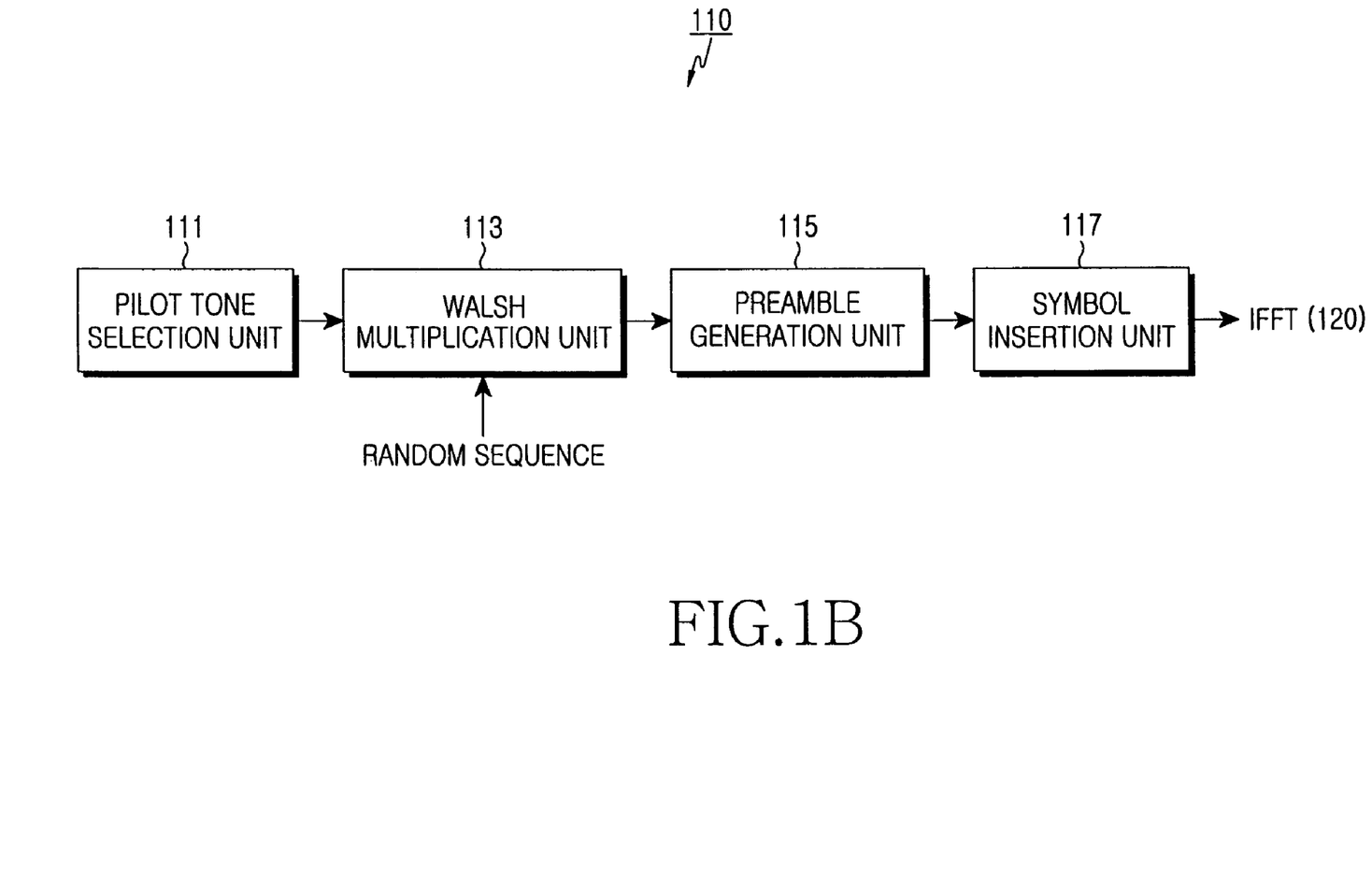
FIG. 1B is a block diagram illustrating the preamble generator of FIG. 1A.

FIG. 1B is a block diagram illustrating the preamble generator 110 of FIG. 1A. Referring to FIG. 1B, the preamble generator 110 includes a pilot tone selection unit 111 for selecting antenna-by-antenna pilot tones; a Walsh multiplication unit 113 for generating a plurality of Walsh codes and multiplying the selected antenna-by-antenna pilot tones by designated Walsh codes; a preamble generation unit 115 for assigning to at least two symbol durations, the pilot tones multiplied by the Walsh codes and generating preambles; and, a symbol insertion unit 117 for inserting symbols including the preambles assigned to the at least two symbol durations. When a random sequence is used in FIG. 1B discriminate, a base station the Walsh multiplication unit 113 multiplies the designated Walsh codes by a random sequence to output of the multiplication result.

Figure 2:
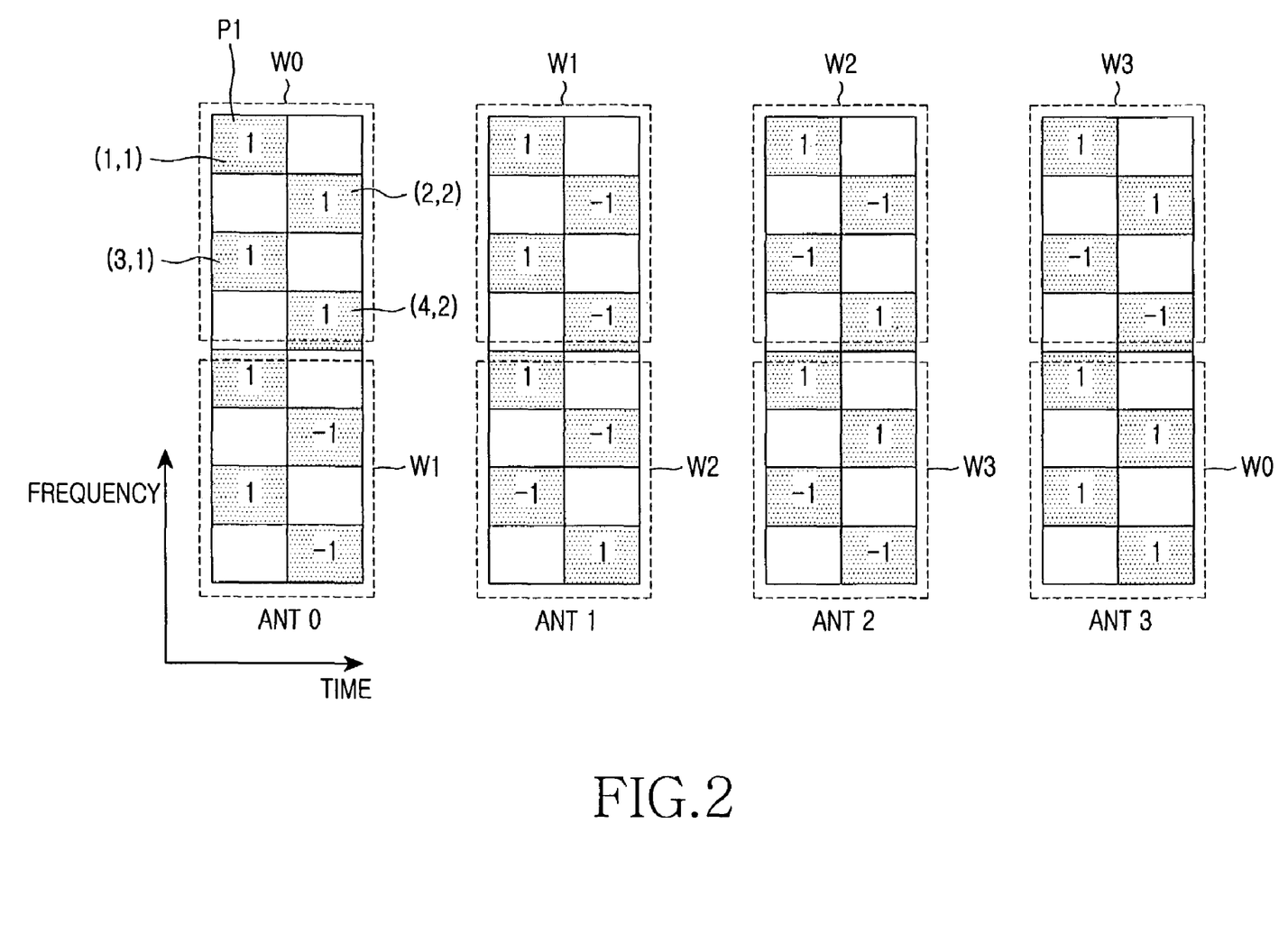
FIG. 2 illustrates a preamble structure for the preamble generation method in a broadband wireless communication system in accordance with an embodiment of the present invention.

FIG. 2 illustrates a preamble structure for a broadband wireless communication system in accordance with an embodiment of the present invention. The preamble generation method is performed through the preamble generator 110 of FIG. 1A.

FIG. 2 illustrates the arrangement of pilot tones P1 (corresponding to shaded parts) configuring two preambles according to the four antennas ANT0 to ANT3. As illustrated in FIG.

2, the pilot tones P1 are assigned for two OFDM symbol durations along the time axis. The four antennas ANT0 to ANT3 have the pilot tones P1 at the same points on the time axis. When Walsh codes assigned to one antenna are multiplied by the pilot tones P1 along the frequency axis, a gain in frame synchronization performance is obtained.

The orthogonality between the antennas ANT0 to ANT3 in FIG. 2 can be maintained by the orthogonality between the Walsh codes multiplied by the pilot tones P1. That is, when it is assumed that f included in (f,t) denotes an f-th frequency, and t included in (f,t) denotes a pilot tone assigned to a t-th symbol, four pilot tones (1,1), (2,2), (3,1) and (4,2) associated with the antenna ANT0 are first multiplied by Walsh Code 0 (W0). The next four pilot tones associated with the antenna ANT0 are multiplied by Walsh Code 1 (W1). Other pilot tones (not illustrated) are sequentially multiplied by Walsh Code 2 (W2) and Walsh Code 3 (W3).

Similarly, the four first pilot tones and others associated with the antenna ANT1 are sequentially multiplied by a Walsh code stream of W1, W2, W3, W0, W1, W2, etc. As described above different Walsh code streams are multiplied by pilot tones associated with each antennas so that they can be distinguished from each other. When Walsh codes are cyclically multiplied by pilot tones according to the antennas ANT0 to ANT3, a frame synchronization gain can be obtained as well.

Preferably, consecutive pilot tones during each of the two OFDM symbol durations are spaced by an interval corresponding to one pilot tone as illustrated in FIG. 2. Frame synchronization is improved by multiplying each antenna's assigned Walsh code stream by pilot tones every other unit of time.

When it is assumed that channel variation between the four pilot tones P1 is not present, channel estimation is achieved by multiplying a received signal of a receiver by the transpose of a Hadamard matrix defined by the following Equation (1);

$$C = \begin{bmatrix} 1 & 1 & 1 & 1 \\ 1 & -1 & -1 & 1 \\ 1 & 1 & -1 & -1 \\ 1 & -1 & 1 & -1 \end{bmatrix} \quad (1)$$

Figure 3:
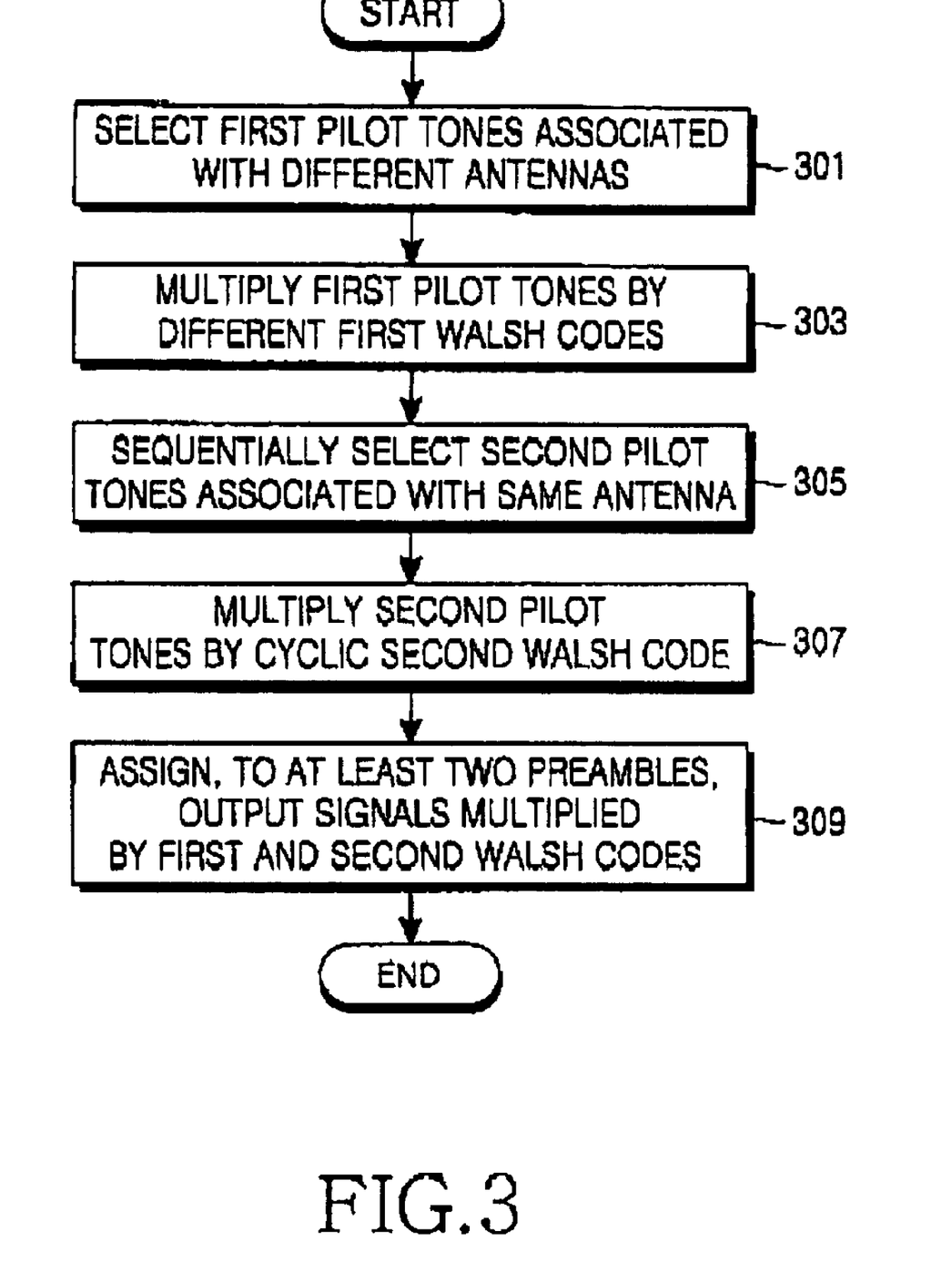
FIG. 3 is a flow chart illustrating the preamble generation method in broadband wireless communication system in accordance with an embodiment of the present invention.

FIG. 3 is a flow chart illustrating the preamble generation method according to an embodiment of the present invention. The preamble generation method of FIG. 3 uses the preamble structure of FIG. 2.

In step 301, first pilot tones are selected that are associated with different antennas ANT0 to ANT3 within a symbol duration range in which preambles are assigned. The number of first pilot tones increases in proportion to the number of antennas. Preferably, when the pilot tones are selected, consecutive pilot tones during each symbol time are spaced by one pilot tone.

In step 303, the first pilot tones in the same frequency band are multiplied by different first Walsh codes on an antenna-by-antenna basis. For example, first pilot tones (1,1), (2,2), (3,1) and (4,2) for the antenna ANT0 are multiplied by W0. First pilot tones for the antennas ANT1 to ANT3 are sequentially multiplied by W1 to W3.

In step 305, second pilot tones, subsequent to the first pilot tones, associated with the same antenna are selected along the frequency axis within the symbol duration range in which preambles are assigned. In this case, the second pilot tones are arranged like the first pilot tones illustrated in FIG. 2.

In step 307, the selected second pilot tones are multiplied by a second Walsh code serving as a cyclic code. For example, the first pilot tones (1,1), (2,2), (3,1) and (4,2) for the antenna ANT0 are multiplied by W0, and the second pilot tones are sequentially multiplied by W1 to W3.

Accordingly, the pilot tones to be transferred to the antenna ANT0 are multiplied by cyclic Walsh codes in the order of W0, W1, W2, and W3 along the frequency axis. The pilot tones to be transferred to the antenna ANT1 are multiplied by cyclic Walsh codes in the order of W1, W2, W3, and W0 along the frequency axis. The pilot tones to be transferred to the antenna ANT2 are multiplied by cyclic Walsh codes in the order of W2, W3, W0, and W1 along the frequency axis. The pilot tones to be transferred to the antenna ANT3 are multiplied by cyclic Walsh codes in the order of W3, W0, W1, and W2 along the frequency axis.

In step 309, the transmitter assigns, to at least two preambles, output signals multiplied by the first and second Walsh codes, and transmits the output signals to a wireless network.

Figure 4:
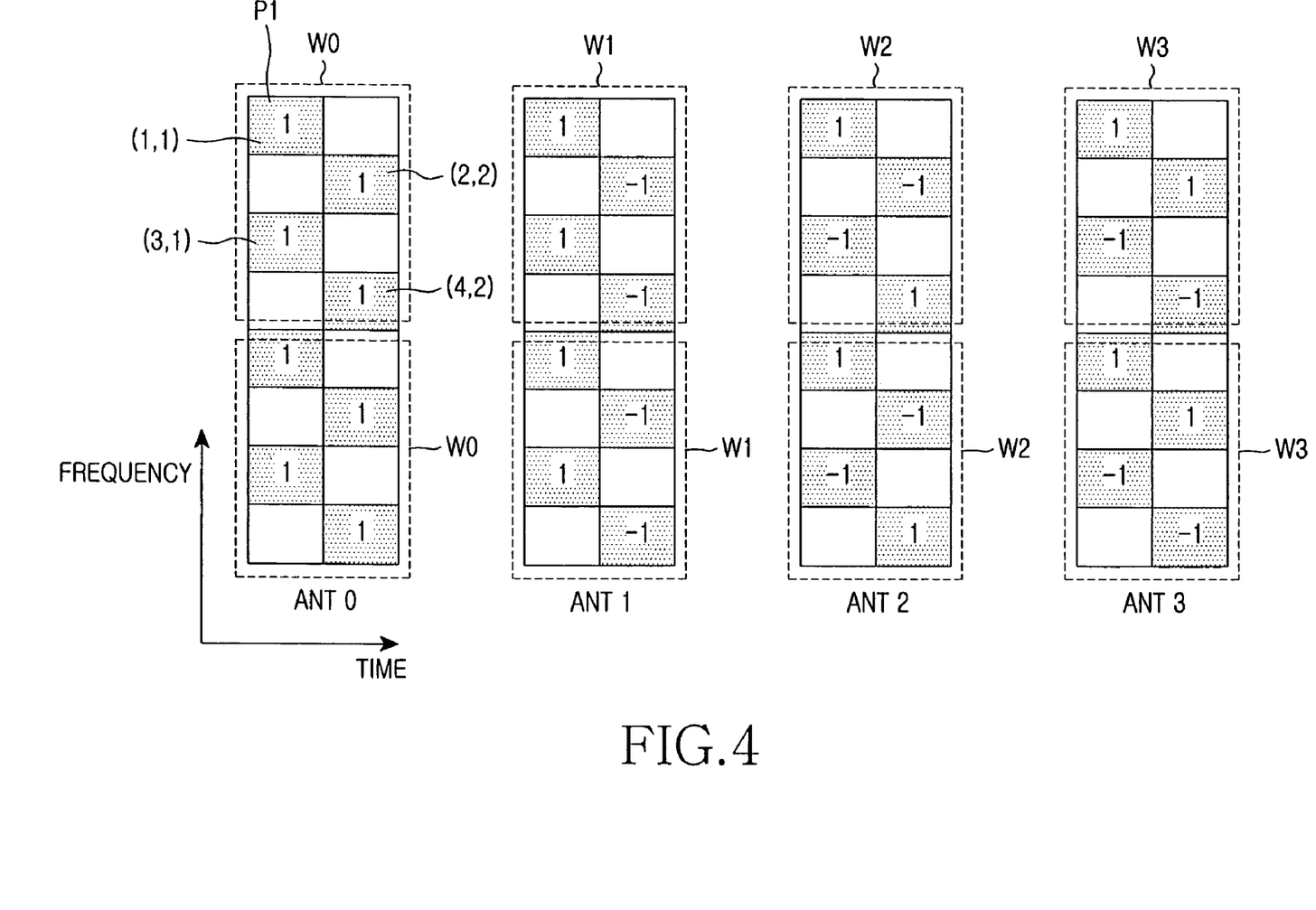
FIG. 4 illustrates a preamble structure for the preamble generation method in broadband wireless communication system in accordance with an alternative embodiment of the present invention.

FIG. 4 illustrates a preamble structure in accordance with alternative embodiment of the present invention. The preamble structure of FIG. 4 is different from that of FIG. 2 in that pilot tones of the antennas ANT0 to ANT3 are multiplied by different Walsh codes, except for pilot tones to be transferred to the same antenna which are multiplied by the same Walsh code, so that the antennas ANT0 to ANT3 are distinguished from each other. Four antennas and two preambles in the embodiments of FIGS. 2 and 4. It should be noted that the method of the present invention can be used for a system with more antennas, e.g., eight or sixteen antennas.

In such a case, Walsh values assigned to respective pilot tones may be different, but the assignment method is the same as that of FIG. 2 or 4. When eight or more antennas are used, the number of preambles can be extended.

Figure 5:
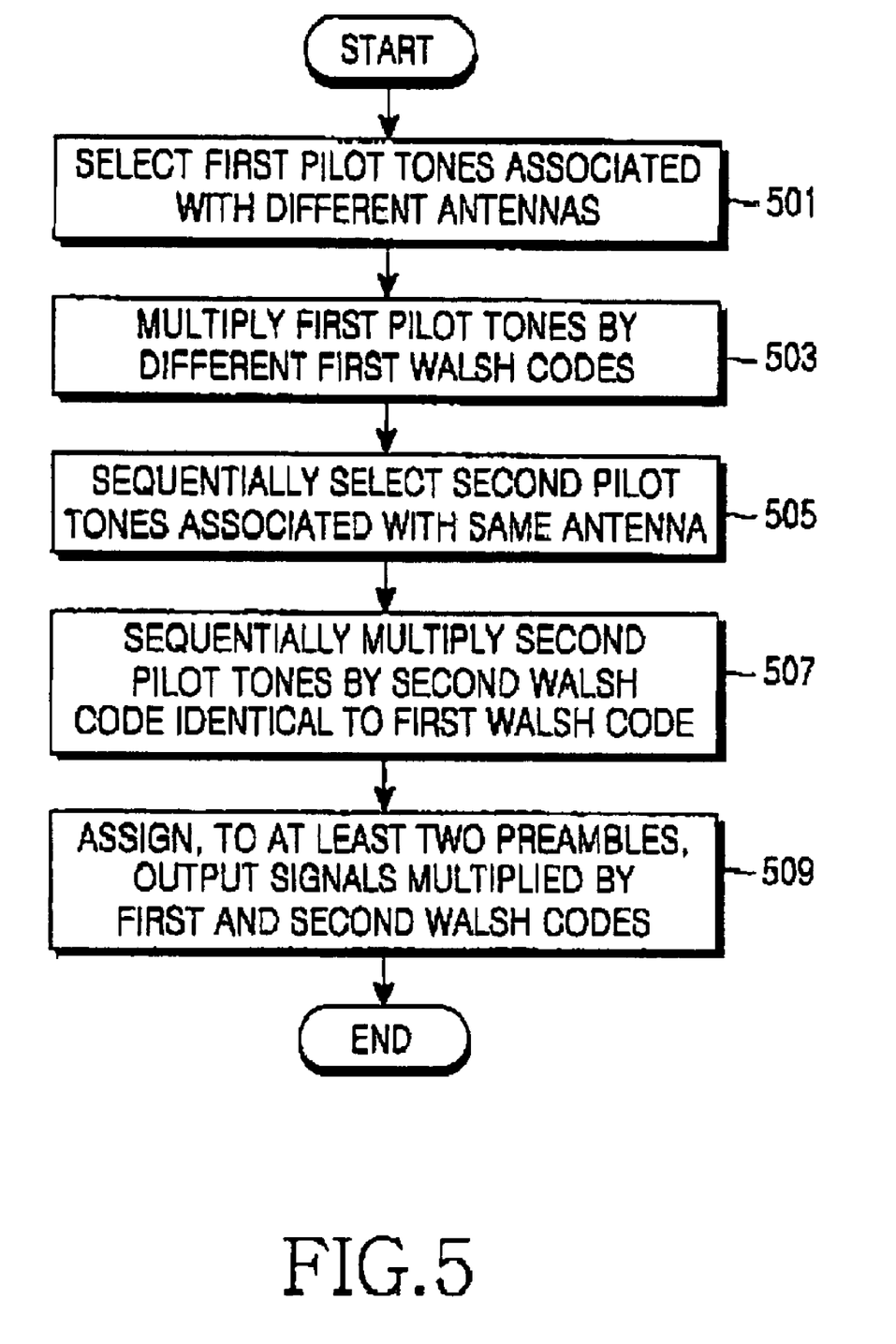
FIG. 5 is a flow chart illustrating the preamble generation method in a broadband wireless communication system in accordance with a further alternative embodiment of the present invention.

FIG. 5 is a flow chart illustrating the preamble generation method in accordance with an alternative embodiment of the present invention. The preamble generation method of FIG. 5 uses the preamble structure of FIG. 4.

Because the steps other than step 507 of FIG. 5 are the same as those of FIG. 3, their detailed description will be omitted. In step 507 of FIG. 5, the Walsh code to be multiplied by second pilot tones for the same antenna uses a first Walsh code multiplied by first pilot tones.

In this case, pilot tones to be transferred to the antenna ANT0 are multiplied by W0 along the frequency axis; pilot tones to be transferred to the antenna ANT1 are multiplied by W1 along the frequency axis; and, pilot tones to be transferred to the antenna ANT2 are multiplied by W2 along the frequency axis. Pilot tones to be transferred to the antenna ANT3 are multiplied by W3 along the frequency axis.

As apparent from the above description, the present invention can efficiently obtain frame synchronization through preambles with orthogonality on time, frequency and code axes in a base station using multiple antennas, and can use a spatial multiplexing technique capable of maximizing transmit diversity gain and frequency efficiency through antenna-by-antenna channel estimation.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for generating preambles in a wireless communication system using multiple antennas based on a multiple input multiple output (MIMO) scheme, comprising:
   selecting first pilot tones associated with different antennas, and multiplying the first pilot tones by different first Walsh codes;
   sequentially selecting second pilot tones associated with the same antenna along a frequency axis, and multiplying the second pilot tones by a second Walsh code; and
   generating preambles by assigning, to at least two symbol durations, output signals multiplied by the first and second Walsh codes,
   wherein consecutive pilot tones during each of the at least two symbol durations are spaced by an interval corresponding to one pilot tone, and code streams of the first and second Walsh codes are alternately multiplied by the pilot tones.

2. The method according to claim 1, wherein multiplying the second pilot tones by the second Walsh code comprises:
   setting, as the second Walsh code, a plurality of cyclic Walsh codes along the frequency axis.

3. The method according to claim 1, wherein multiplying the second pilot tones by the second Walsh code comprises:
   setting, as the second Walsh code, a first Walsh code for discriminating a corresponding antenna.

4. The method according to claim 1, further comprising:
   multiplying the first and second Walsh codes by a random sequence for discriminating a base station.

5. The method according to claim 1, wherein the number of first and second pilot tones is a multiple of 4.

6. The method according to claim 5, wherein the number of first and second pilot tones increases in proportion to the number of antennas.

7. An apparatus for generating preambles in a wireless communication system using multiple antennas based on a multiple input multiple output (MIMO) scheme, comprising:
   a pilot tone selection unit for selecting first pilot tones associated with different antennas, and sequentially selecting second pilot tones associated with the same antenna along a frequency axis;
   a Walsh multiplication unit for multiplying the first pilot tones by different first Walsh codes, and multiplying the second pilot tones by a second Walsh code;
   a preamble generation unit for generating preambles by assigning, to at least two symbol durations, output signals multiplied by the first and second Walsh codes; and
   a symbol insertion unit for inserting symbols including the preambles assigned to the at least two symbol durations,
   wherein the Walsh multiplication unit multiplies alternating code streams of the first and second Walsh codes by the pilot tones in a state in which consecutive pilot tones during each of the at least two symbol durations are spaced by an interval corresponding to one pilot tone.

8. The apparatus according to claim 7, wherein the Walsh multiplication unit sets, a plurality of cyclic Walsh codes along the frequency axis as the second Walsh code.

9. The apparatus according to claim 7, wherein the Walsh multiplication unit sets, a first Walsh code for discriminating a corresponding antenna as the second Walsh code.

* * * * *